(12) United States Patent  
Kashihara et al.

(10) Patent No.: US 11,940,215 B2  
(45) Date of Patent: *Mar. 26, 2024

(54) BLAST FURNACE APPARATUS AND OPERATION METHOD FOR BLAST FURNACE

(71) Applicant: JFE STEEL CORPORATION, Tokyo (JP)

(72) Inventors: Yusuke Kashihara, Tokyo (JP); Yuki Okamoto, Tokyo (JP); Natsuo Ishiwata, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 843 days.

This patent is subject to a terminal disclaimer.

(21) Appl. No.: 17/040,537

(22) PCT Filed: Mar. 25, 2019

(86) PCT No.: PCT/JP2019/012586  
§ 371 (c)(1),  
(2) Date: Sep. 23, 2020

(87) PCT Pub. No.: WO2019/189025  
PCT Pub. Date: Oct. 3, 2019

(65) Prior Publication Data  
US 2021/0041172 A1 Feb. 11, 2021

(30) Foreign Application Priority Data

Mar. 28, 2018 (JP) ................................. 2018-062433

(51) Int. Cl.  
*F27B 1/28* (2006.01)  
*B65G 11/20* (2006.01)  
(Continued)

(52) U.S. Cl.  
CPC .............. *F27B 1/28* (2013.01); *B65G 11/206* (2013.01); *C21B 7/18* (2013.01); *F27B 1/20* (2013.01);  
(Continued)

(58) Field of Classification Search  
CPC ...... F27B 1/20; F27B 1/28; F27D 2003/0075; F27D 3/10; F27D 3/0031; F27D 3/0024;  
(Continued)

(56) References Cited

U.S. PATENT DOCUMENTS 4,197,495 A 4/1980 Matsui et al.  
4,339,664 A 7/1982 Wiklund et al.  
(Continued)

FOREIGN PATENT DOCUMENTS

CN 101492750 A 7/2009  
CN 102732659 A 10/2012  
(Continued)

OTHER PUBLICATIONS

Dec. 3, 2020, the Extended European Search Report issued by the European Patent Office in the corresponding European Patent Application No. 19775560.6.  
(Continued)

*Primary Examiner* — Scott R Kastler  
*Assistant Examiner* — Michael Aboagye  
(74) *Attorney, Agent, or Firm* — KENJA IP LAW PC

(57) ABSTRACT

Disclosed is a blast furnace apparatus includes: a rotating chute; a profile measurement device configured to measure surface profiles of a burden charged into the furnace; and a tilt angle controller configured to control a tilt angle of the chute, in which the device includes a radio wave distance meter installed on the furnace top and configured to measure the distance to the surface of the burden, derives the profiles on a basis of distance data for the entire furnace obtained by  
(Continued)

scanning a detection wave of the distance meter in the furnace in a circumferential direction, and includes at least one of arithmetic units configured to command during rotation, on a basis of the surface profiles obtained, the controller to change the tilt angle of the chute, or a controller to change a rotational speed of the chute or a feed speed of the burden fed to the chute.

9 Claims, 6 Drawing Sheets

(51) Int. Cl.
    *C21B 7/18*     (2006.01)
    *F27B 1/20*     (2006.01)
    *F27D 3/00*     (2006.01)
    *F27D 3/10*     (2006.01)
    *G01S 13/89*     (2006.01)

(52) U.S. Cl.
    CPC ......... *F27D 3/0024* (2013.01); *F27D 3/0031* (2013.01); *F27D 3/10* (2013.01); *G01S 13/89* (2013.01); *B65G 2201/045* (2013.01); *B65G 2203/02* (2013.01); *B65G 2203/042* (2013.01); *F27D 2003/0075* (2013.01); *F27D 2003/0089* (2013.01)

(58) Field of Classification Search
    CPC ............. F27D 2019/0075; F27D 21/02; B65G 11/206; G01S 13/89; C21B 7/18
    USPC ............................... 266/92, 184, 197, 99, 44
    See application file for complete search history.

(56) References Cited

U.S. PATENT DOCUMENTS

| | | | | |
|---|---|---|---|---|
| 4,463,437 A | * | 7/1984 | Schenck | G01J 5/026 374/126 |
| 4,747,062 A | * | 5/1988 | Esau | G01F 23/162 73/299 |
| 5,971,286 A | | 10/1999 | Saxen et al. | |
| 10,415,107 B2 | | 9/2019 | Kayano et al. | |
| 10,877,144 B2 | * | 12/2020 | Morgenstern | F27B 1/28 |
| 11,021,765 B2 | * | 6/2021 | Kayano | G01S 13/88 |
| 11,512,899 B2 | * | 11/2022 | Kashihara | F27D 3/18 |

FOREIGN PATENT DOCUMENTS

| | | | | | |
|---|---|---|---|---|---|
| CN | 103160628 | * | 6/2013 | ............... | F27B 1/20 |
| CN | 104531924 | A | 4/2015 | | |
| CN | 107614707 | A | 1/2018 | | |
| CN | 108486300 | * | 9/2018 | ............... | F27B 1/20 |
| JP | S58123808 | A | 7/1983 | | |
| JP | H02190409 | A | 7/1990 | | |
| JP | H0421707 | A | 1/1992 | | |
| JP | H0611328 | A | 1/1994 | | |
| JP | 2017095761 | * | 6/2017 | ............... | F27B 1/20 |
| JP | 2017095761 | A | 6/2017 | | |
| RU | 2089617 | C1 | 9/1997 | | |
| WO | 2015133005 | A1 | 9/2015 | | |
| WO | 2017022818 | A1 | 2/2017 | | |

OTHER PUBLICATIONS

Nov. 8, 2022, Office Action issued by the China National Intellectual Property Administration in the corresponding Chinese Patent Application No. 201980020735.1 with English language search report.

Song Yongqing et al., Practical Training Instruction for Blast Furnace Steelmaking, Apr. 30, 2016, p. 8 .

Apr. 12, 2022, Office Action issued by the Korean Intellectual Property Office in the corresponding Korean Patent Application No. 10-2020-7030581 with English language concise statement of relevance.

Mar. 19, 2021, Office Action issued by the Federal Service for Intellectual Property, Patents and Trademarks of the Russian Federation in the corresponding Russian Patent Application No. 2020134028 with English language search report.

Aug. 10, 2021, Office Action issued by the China National Intellectual Property Administration in the corresponding Chinese Patent Application No. 201980020735.1 with English language search report.

Jun. 11, 2019, International Search Report issued in the International Patent Application No. PCT/JP2019/012586.

* cited by examiner

BLAST FURNACE APPARATUS AND OPERATION METHOD FOR BLAST FURNACE

TECHNICAL FIELD

This disclosure relates to a blast furnace apparatus, in particular a blast furnace apparatus for charging raw materials into a blast furnace by a bell-less charging device provided with a rotating chute, and an operation method for a blast furnace. This operation of charging a set of ore and coke layers is usually called one charge, in which ore and coke are charged separately in a plurality of batches. In each batch, raw materials in a bunker provided on the blast furnace top are typically charged into the blast furnace while varying the angle of a rotating chute to obtain the desired deposit shape.

BACKGROUND

In general, in blast furnace operation, ore (which may be mixed with a part of coke) and coke are alternately charged as raw materials from the blast furnace top, and the blast furnace is filled with the raw materials with ore layers and coke layers alternately deposited on top of another.
In blast furnace operation, it is important to maintain an appropriate burden distribution at the blast furnace top. If the burden distribution is inappropriate, the gas flow distribution will be uneven, the gas permeability will be reduced, and the reduction efficiency will decrease, leading to lower productivity and unstable operation. In other words, blast furnace operation can be stabilized by properly controlling the gas flow distribution.

As one of measures for controlling the gas flow distribution, a method using a bell-less charging device with a rotating chute (distributing chute) is known. In this charging device, the gas flow distribution is controlled by selecting the tilt angle and the number of rotations of the rotating chute, and by adjusting the drop positions and deposition amounts of raw materials in the blast furnace radial direction to control the burden distribution.

In the burden distribution control, it is advantageous to grasp the burden distribution. For this purpose, the surface profiles of the blast furnace burden (raw material deposit) should be measured. In order to measure the surface profiles of the blast furnace burden, in general, the distance to the surface of the blast furnace burden is measured by sending a detection wave such as a microwave to the surface of the blast furnace burden and receiving the detection wave reflected from the surface of the blast furnace burden, and the surface profiles of the blast furnace burden are obtained on a basis of the measured distance. A most common method is to insert a measuring lance with an antenna for detection waves from the side of the throat toward the center of the blast furnace.

For example, JP2017-95761A (PTL 1) describes that using the distance measurement with detection waves as described above, the surface profiles of the blast furnace burden are measured for each batch, and an adjustment is made to notches and/or the number of rotations of the rotating chute according to the charging distribution of ore and coke obtained on a basis of the measurement results. Further, WO2015/133005 (PTL 2), the profiles are measured during the rotation of the rotating chute or at each predetermined number of rotations of the rotating chute to control the rotating chute.

CITATION LIST

Patent Literature

PTL 1 JP2017-95761A
PTL 2 WO2015/133005

SUMMARY

Technical Problem

The technique described in PTL 1 makes it possible to correct the variation in the charging distribution between batches on a basis of the results of measuring the deposition surface of the blast furnace burden after charging of raw materials. With the conventional measuring methods, however, measurement itself takes time, and in addition to being unable to perform rapid measurement, the measuring lance must be evacuated outside the blast furnace body before charging raw materials, causing a problem of lower measurement frequency. Also, in the method described in PTL 1, it is possible to adjust the gas distribution in the radial direction of the blast furnace by selecting the tilt angle and the number of rotations of the rotating chute to adjust the drop position and the amount of raw materials deposited in the radial direction of the blast furnace. However, there is still room for improvement in the current situation where the gas flow distribution in the circumferential direction of the blast furnace is required to be adjusted.

The method described in PTL 2 similarly performs an adjustment in the radial direction, and there is still room for improvement in the current situation where the gas flow distribution in the circumferential direction of the furnace is required to be adjusted.

In addition, both methods do not take into account the effect of the descent speed of the burden, and there is still room for improvement in this regard as well.

It would thus be helpful to provide a measurement means to grasp the surface profiles of the blast furnace burden in the circumferential direction of the blast furnace accurately and promptly, and to provide a blast furnace apparatus that can make use of the means for controlling the tilt angle of the rotating chute and for controlling the charge speed of the burden. It would also be helpful to propose a method to measure the surface profiles of the burden at each rotation of the rotating chute and to maintain the proper distribution of the blast furnace burden on a basis of the measurement results of the surface profiles using the blast furnace apparatus.

Solution to Problem

We thus provide the following embodiments:
Embodiment 1. A blast furnace apparatus comprising: a rotating chute configured to charge a raw material into a blast furnace from a blast furnace top; a profile measurement device configured to measure surface profiles of a burden charged into the blast furnace through the rotating chute; and a tilt angle controller configured to control a tilt angle of the rotating chute, wherein the profile measurement device comprises a radio wave distance meter, which is installed on the blast furnace top and configured to measure the distance to the surface of the burden in the blast furnace, and derives the surface profiles of the burden on a basis of distance data for the entire blast furnace related to distances to the surface of the burden obtained by scanning a detection wave of the radio wave distance meter in the blast furnace in a circumferential direction; and the profile measurement device comprises at least one of an arithmetic unit configured to command, on a basis of the surface profiles obtained, the tilt angle controller to change the tilt angle of the rotating chute during rotation, an arithmetic unit configured to command, on a basis of the surface profiles obtained, a speed controller to change a rotational speed of the rotating chute during rotation, or an arithmetic unit configured to command, on a basis of the surface profiles obtained, a speed controller to change a feed speed of the burden fed to the rotating chute during rotation.

Embodiment 2. The blast furnace apparatus according to Embodiment 1, wherein the profile measurement device further comprises an arithmetic unit configured to calculate a descent speed of the burden over an entire circumference of the blast furnace on a basis of the surface profiles of the burden.

Embodiment 3. An operation method for a blast furnace using the blast furnace apparatus as recited in Embodiment 1 or Embodiment 2 in which ore and coke are charged from the rotating chute into the blast furnace, the operation method comprising: deriving, by the profile measurement device, surface profiles of the burden; and in a case where variation in the surface profiles derived, or variation in descent speeds of the burden derived from the surface profiles derived or variation in ore layer thickness ratios, is greater than a predetermined value, adjusting either or both of a charge position of at least one of ore or coke charged through the rotating chute and a charge speed of at least one of ore or coke charged through the rotating chute.

Embodiment 4. The operation method for a blast furnace according to Embodiment 3, wherein the adjusting of the charge position includes changing the tilt angle of the rotating chute during rotation and adjusting the surface profiles at each rotation of the rotating chute.

Embodiment 5. The operating method for a blast furnace according to Embodiment 3 or Embodiment 4, wherein the adjusting of the charge speed is performed during rotation of the rotating chute.

Advantageous Effect

According to the present disclosure, it is possible to accurately and promptly grasp surface profiles of the blast furnace burden in the circumferential direction of the blast furnace, and to immediately change the tilt angle of the rotating chute and the charge speed of the burden on a basis of the surface profiles obtained. Consequently, the gas flow distribution in the blast furnace can be properly controlled. For this reason, in blast furnace operation, high-reduction efficiencies of ores can be obtained while stabilizing the operation.

DETAILED DESCRIPTION

Figure 1:
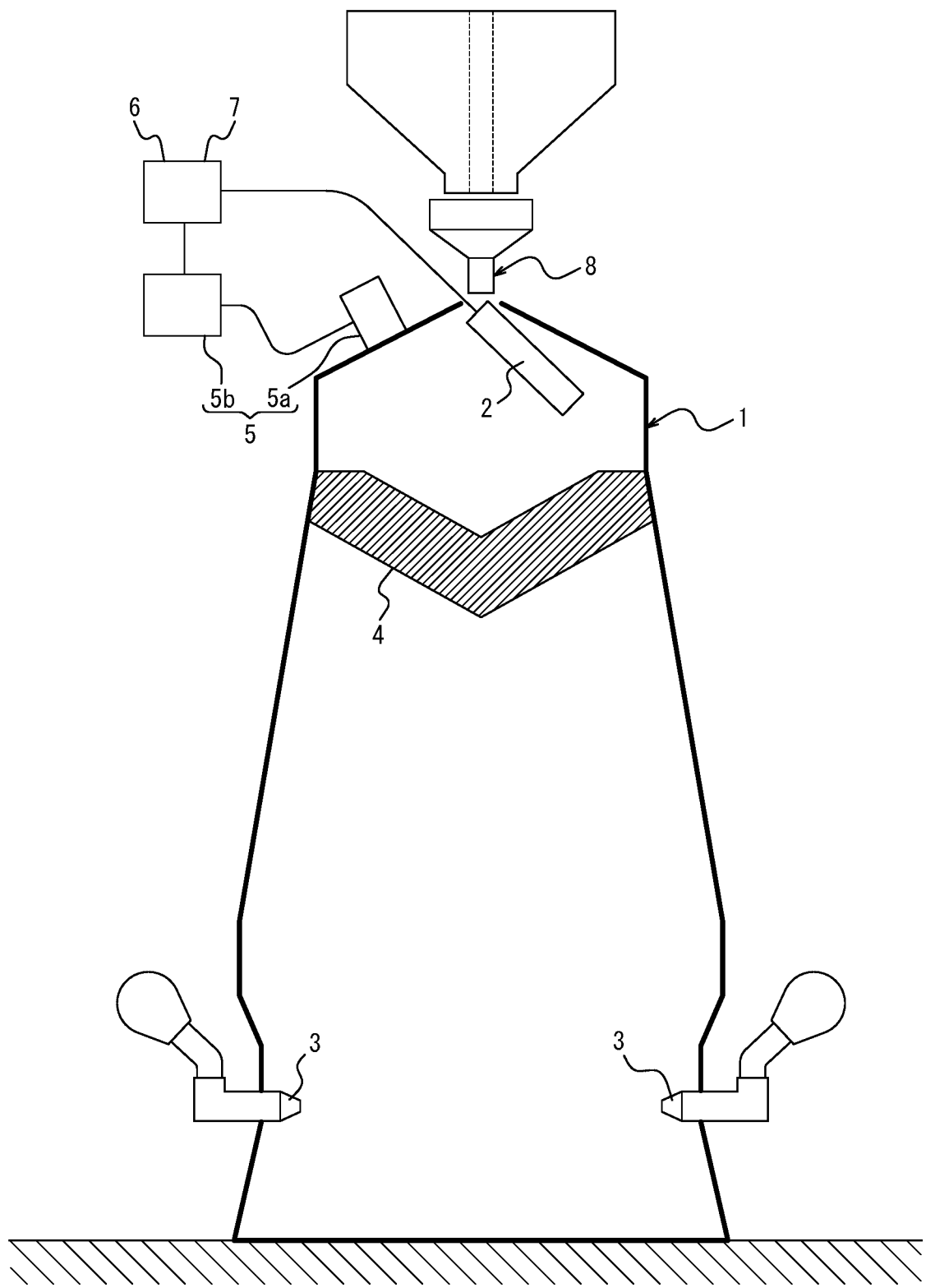
FIG. 1 illustrates a construction of a blast furnace apparatus.

Hereinbelow, a blast furnace apparatus according to the present disclosure will be described in detail with reference to FIG. 1.

Specifically, a blast furnace apparatus according to the present disclosure comprises: a rotating chute 2 configured to charge raw materials such as ore including coke into a furnace top of a blast furnace body 1; a plurality of tuyeres 3 configured to blow hot blast and pulverized coal into the blast furnace; a profile measurement device 5 configured to measure surface profiles of a burden 4 charged into the blast furnace through the rotating chute 2; and a tilt angle controller 6 configured to control a tilt angle of the rotating chute 2. The blast furnace apparatus further comprises a rotational speed controller 7 configured to control a rotating speed of the rotating chute 2. The blast furnace apparatus further comprises, between the hopper provided on the blast furnace top and the rotating chute 2, a burden feed speed controller 8 configured to control a feed speed of the burden. Examples of the burden feed speed controller 8 include a mechanism that controls the opening degree of a gate valve provided in the flow path of the burden.

In the instance illustrated in FIG. 1, the rotational speed controller 7 and a controller for controlling the opening degree of the gate valve of the burden feed speed controller 8 are placed within the tilt angle controller 6. Although it suffices for the blast furnace apparatus according to the present disclosure to include at least one selected from the tilt angle controller, the rotational speed controller, and the burden feed speed controller, the blast furnace apparatus preferably comprises all.

Here, the profile measurement device 5 has a radio wave distance meter 5a installed on the blast furnace top of the blast furnace body 1 to measure a distance to the surface of the burden 4 in the blast furnace, and an arithmetic unit 5b configured to derive surface profiles of the burden 4 on a basis of distance data for the entire blast furnace related to distances to the surface of the burden 4 obtained by scanning a detection wave of the radio wave distance meter 5a in a circumferential direction of the blast furnace body 1.

Figure 2:
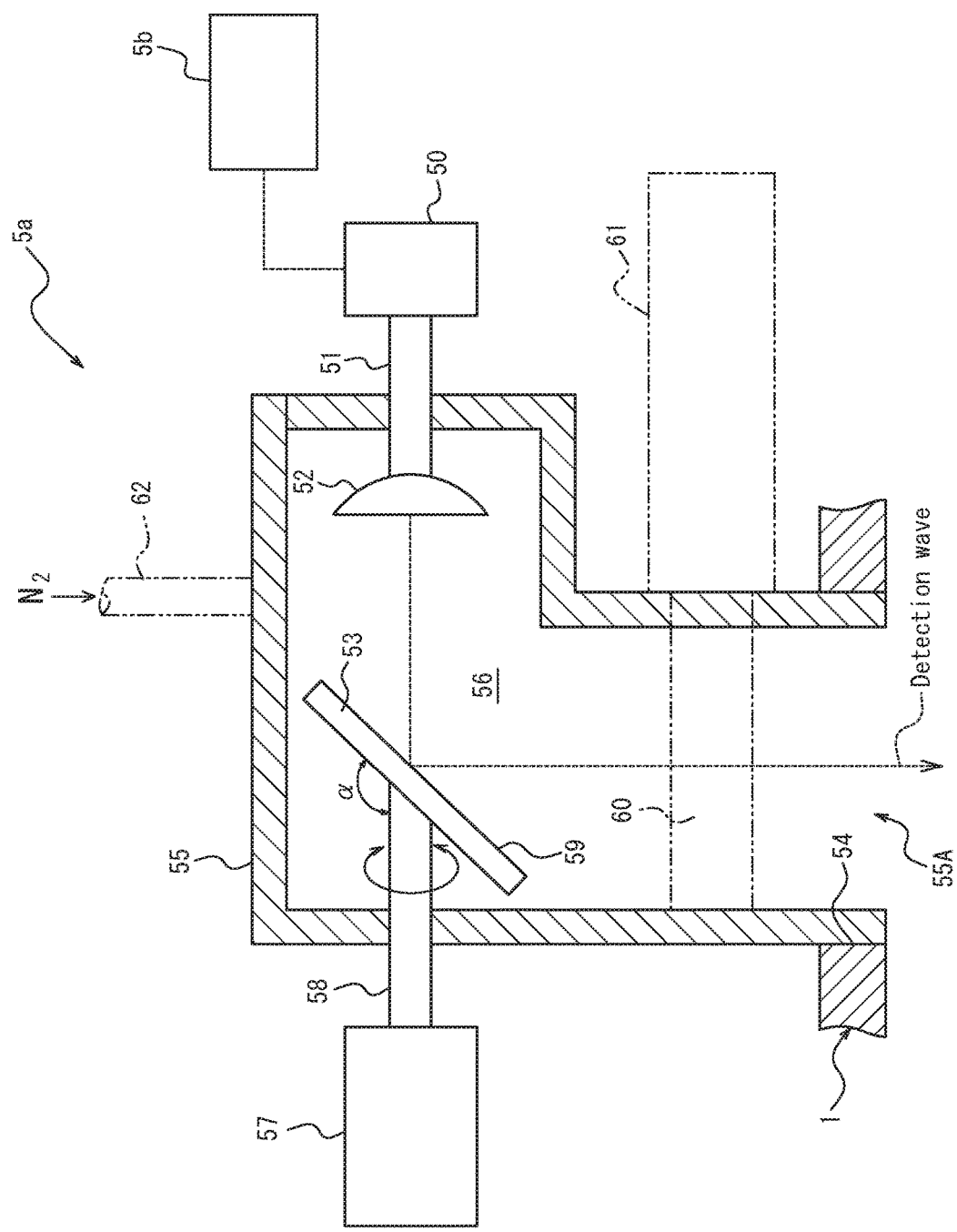
FIG. 2 illustrates a configuration of a profile measurement device.
Figure 3:
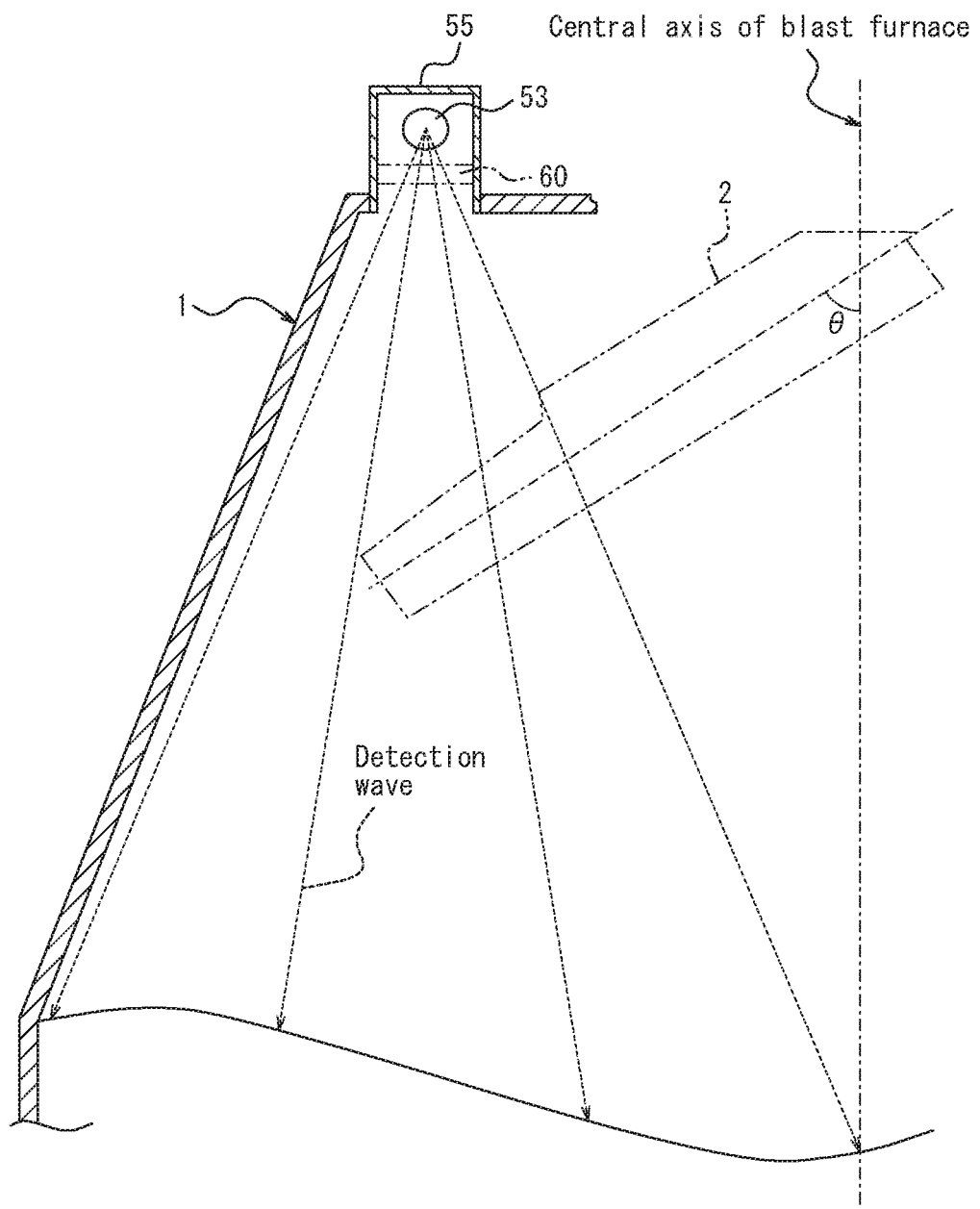
FIG. 3 illustrates an operation of a distance meter of the profile measurement device.

The distance meter 5a is of radio wave type and may be, for example, a device having the configuration illustrated in FIG. 2 or 3. That is, the distance meter 5a, as illustrated in FIG. 2, a detection wave transceiver 50 configured to transmit and receive a detection wave such as a millimeter wave or a microwave, an antenna 52 connected via a waveguide 51 to the detection wave transceiver 50, and a detection wave reflector 53 with variable reflection angles provided opposite to the antenna 52. A detection wave transmitted from the detection wave transceiver 50 and radiated from the antenna 52 is reflected by the detection wave reflector 53 to be incident on the surface of the blast furnace burden, and the detection wave reflected by the surface of the blast furnace burden is received by the detection wave transceiver 50 via the detection wave reflector 53 and the antenna 52. Then, the reflection angle of the detection wave reflector 53 is adjusted while measuring the distance to the surface of the blast furnace burden, such that the radiation of the detection wave is scanned in the blast furnace in the circumferential direction.

A window hole 54 is formed in a furnace body portion at the blast furnace top at a position where the surface of the blast furnace burden (deposition surface) can be seen downward or obliquely downward, and a casing 55 having a predetermined pressure resistance is fixedly mounted further outward than the blast furnace body so as to cover the window hole 54. The inside of the casing 55 constitutes a housing chamber 56, and the housing chamber 56 is open to the internal space of the blast furnace through the window hole 54 (thus, an opening 55A is formed). Furthermore, the antenna 52 is disposed on the inside of the housing chamber 56, and the detection wave transceiver 50 is disposed on the outside of the housing chamber 56 (outside the blast furnace body 1). The waveguide 51, which connects the detection wave transceiver 50 and the antenna 52, passes through the casing 55 and supports the antenna 52 at its tip.

Further, in the housing chamber 56, the detection wave reflector 53 is disposed so as to face the antenna 52. On the outside of the housing chamber 56 (outside the blast furnace body 1), a driver 57 that is configured to rotate the detection wave reflection 53 is disposed. The driver 57 has a rotary drive shaft 58 passing through the casing 55 and supports the detection wave reflector 53 at its tip.

Here, the positional relationship between the antenna 52, the detection wave reflector 53, and the driver 57 thereof, and the opening 55A of the housing chamber 56 satisfies the following condition: (i) an extension line of the central axis of the antenna 52 coincides with the central axis of the rotary drive shaft 58 of the driver 57; (ii) the detection wave reflector 53 is fixed to the rotary drive shaft 58 of the driver 57 at a changeable angle α with respect to the rotary drive shaft 58 such that it is operable to achieve linear scanning and circumferential scanning; and (iii) the antenna 52 and the detection wave reflector 53 are disposed with respect to the opening 55A such that a detection wave transmitted from the antenna 52 and reflected by the detection wave reflector 53 is guided through the opening 55A and into the blast furnace.

In addition, in order to avoid damage to a reflective surface 59 or the like by the blown up raw materials hitting the detection wave reflector 53 when the burden is blown through the interior of the blast furnace, the detection wave reflector 53 can be stopped in a rotating position such that its back side (opposite side of the reflective surface 59) faces the opening 55A while measurement is not performed.

The detection wave transceiver 50 generates a detection wave (such as a millimeter wave or a microwave) whose frequency varies continuously in time over a certain range, and is capable of transmitting and receiving the detection wave.

As the antenna 52, a parabolic antenna, a horn antenna, or the like may be used. Among these, a lensed horn antenna is particularly desirable because of its superior directional characteristics.

The detection wave reflector 53 is, for example, made of a metal material such as stainless steel, and is usually circular in shape although the shape is not limited. By rotating the detection wave reflector 53 with the rotary drive shaft 58 of the driver 57, it is possible to scan the radiation direction of the detection wave transmitted from the antenna 52 in its central axis direction and reflected by the detection wave reflector 53 in a linear fashion. Then, by changing the angle α between the detection wave reflector 53 and the rotary drive shaft 58, it is possible to arbitrarily change the position of the line to be scanned. Specifically, rotation of the rotary drive shaft 58 enables linear scanning in a lateral direction with respect to the direction of detection wave transmission, and a change in the angle α enables linear scanning in a forward and backward direction with respect to the direction of detection wave transmission. With this mechanism, by adjusting the angle of rotation of the rotary drive shaft 58 and the angle of the detection wave reflector 53 at the same time, it is possible to scan the radiation direction of the detection wave in the blast furnace in the circumferential direction.

Between the detection wave reflector 53 and the opening 55A in the housing chamber 56 (in the illustrated example, in the vicinity of opening 55A), a gate valve 60 that is configured to shut off the housing chamber 56 from the interior space of the blast furnace is provided in an open/close position. The gate valve 60 has an open/close actuator 61 that is installed on the outside of the housing chamber 56 (outside the blast furnace body 1) and that causes the gate valve 60 to slidably move to an open or close position. The gate valve 60 is opened during profile measurement and closed otherwise.

In addition, in order to prevent the gas and dust in the blast furnace from entering the housing chamber 56 during measurement and to prevent the gas in the blast furnace from leaking from the casing 55 to the outside, a gas supply pipe 62 for purge gas is connected to the casing 55, and a purge gas (usually nitrogen gas) of a predetermined pressure is supplied to the housing chamber 56 through this gas supply pipe 62.

This profile measurement device includes an arithmetic unit 5b that is configured to calculate a distance from the antenna 52 to the surface of the blast furnace burden based on data received and detected by the detection wave transceiver 50, and to further determine the surface profiles of the blast furnace burden from this distance data.

In the profile measurement device described above, a detection wave with a continuously changing frequency generated by the detection wave transceiver 50 is transmitted from the antenna 52 and radiated toward the surface of the blast furnace burden via the detection wave reflector 53. The detection wave reflected by the surface of the blast furnace burden (i.e., a reflected wave) is received by the detection wave transceiver 50 via the detection wave reflector 53. In the detection of the surface of the blast furnace burden using such a detection wave, by changing the reflection angle of the detection wave by causing the driver 57 to rotate the detection wave reflector 53, the radiation direction of the detection wave can be linearly scanned as illustrated in FIG. 3. At this time, by further changing the angle of the detecting wave reflector 53 and the rotary drive shaft 58, it is also possible to perform a scan in the circumferential direction of the blast furnace.

In the arithmetic unit 5b, the round-trip time of the detection wave from the antenna 52 to the surface of the blast furnace burden is usually determined in accordance with a frequency-modulated continuous-wave (FMCW) scheme, and the distance from the antenna 52 to the surface of the blast furnace burden is calculated. Then, surface profiles of the blast furnace burden are determined from the distance data obtained by scanning the radiation direction of the detection wave in the radial direction of the blast furnace as described above.

Furthermore, in order to scan the radiation direction of the detection wave in the circumferential direction, the mechanism for adjusting the rotation angle of the rotary drive shaft 58 and the angle of the detection wave reflector 53 may be replaced with a mechanism for rotating the entire distance meter 5a around the penetration direction of the opening 55A.

Also, instead of scanning the detection wave in the circumferential direction, the circumferential profiles may be obtained by determining the entire surface shape of the blast furnace burden and extracting the circumferential position information.

As described above, the distance meter 5a of the profile measurement device 5 for measuring the surface profiles of the blast furnace burden is a radio wave distance meter, making it possible to measure the distance to the surface of the burden 4 during rotation of the rotating chute 2, and to accurately grasp the burden distribution. In particular, since measurement is available in the radial and circumferential directions of the blast furnace, the burden distribution can be accurately grasped throughout the blast furnace. In other words, it is possible to measure the burden deposition during charging of raw materials at each rotation of the rotating chute 1, and thus the burden distribution can be grasped very accurately.

Preferably, the profile measurement device 5 further comprises an arithmetic unit that is configured to calculate the descent speed of the burden 4 over the entire circumference of the blast furnace on a basis of the surface profiles of the burden 4. This arithmetic function may be assigned to the arithmetic unit 5b, and FIG. 1 illustrates a case where the arithmetic unit 5b additionally performs this arithmetic function.

Here, the descent speed of the burden can be calculated by measuring the surface profiles of the blast furnace burden 4 twice at a predetermined time interval while raw materials are not charged from the rotating chute 2, and using the distance at which the blast furnace burden has descended and the aforementioned time interval. Good data can be obtained if the predetermined time interval is within a range of a few seconds to a few minutes during normal operation. In general, the time interval between the end of charging of one batch and the start of charging of the next batch is about 1 minute to 2 minutes, during which there is no charging of raw materials from the rotating chute 2, and thus the descent speed can be obtained by making two profile measurements.

It is also possible to obtain a raw material layer thickness distribution and an ore layer thickness ratio from the profiles of the blast furnace burden measured multiple times. Specifically, for example, these distribution and ratio can be obtained as follows. First, pre-charging profiles of the coke or ore layer (vertical distances from a particular horizontal cross-sectional position in the blast furnace) are measured. Next, the descent speed is obtained by the above method. Subsequently, post-charging profiles of the coke or ore layer are obtained. Based on the raw material descent distance (=material descent speed×time interval of measurement before and after charging), which is calculated from the raw material descent speed measured and the time interval of measurement of profiles before and after charging, the position to which the surface of raw materials measured before charging descended when the measurement was made after charging is estimated. The differences between the post-charging profiles and the estimated profiles give the thicknesses of the coke or ore layer at respective positions, i.e., a layer thickness distribution. Once the respective thicknesses of the coke and ore layers at one charge have been obtained, it is possible to determine an ore layer thickness ratio (=ore layer thickness/(ore layer thickness+ coke layer thickness) at each position at which the profile was measured.

In the present disclosure, when determining the surface profiles and descent speed of the burden in the circumferential direction, it is preferable to determine circumferential profiles at particular radial positions. The radial positions in the blast furnace are generally expressed in dimensionless radii. As used herein, a dimensionless radius is expressed as: a dimensionless radius=(a horizontal distance between a certain position in the blast furnace and the center of the blast furnace)/(a horizontal distance from the center to the inner surface of the blast furnace) in a horizontal section of the blast furnace. In the present disclosure, it is preferable to determine the surface profiles in the circumferential direction of the blast furnace at a radial position with a dimensionless radius of 0.5 to 0.97. The reason is that at a position where the dimensionless radius is smaller than 0.5, the deviation in the circumferential direction is less problematic, and in a region where the dimensionless radius is larger than 0.97, it is difficult to obtain reference data for the operation in a region where the dimensionless radius is larger than 0.97 because the influence of the inner wall of the blast furnace tends to be large in such region. As the radial position, it is particularly preferable to select a position with a dimensionless radius of 0.7 to 0.95.

In the method according to the present disclosure, a case in which there is variation in the derived surface profiles will be described in detail below. In other words, if there is a fluctuation from the same batch of the previous charge, or if there is any change deviating from the uniform raw material descent and charging states when comparing the profiles measured after the first charge of raw materials with those after the second charge, a charge position adjustment as described later is performed such that a proper profile can be obtained in the third and subsequent charges. As used herein, a proper profile refers to a profile that, in normal operation, has a small deviation in the circumferential direction, i.e., a small bias in distance at each point from the average value. If the profiles after adjustment of the charge position have returned to a proper state, the adjusted charging is continued. On the other hand, if the profiles have changed again from those measured after the first charge, the charge position is similarly adjusted.

In addition, it is preferable to obtain a burden descent speed distribution at least at four locations on the circumference of the blast furnace (e.g., from four equal parts of the circumference such as east, west, south, and north to about 42 locations corresponding to the number of tuyeres). However, there are a few cases where it is not possible to accurately evaluate the descent speed distribution in the circumferential direction, for example, when the descent speed has changed only in a very small local area in the northeast. Therefore, it is desirable to obtain a descent speed distribution that includes all descent speeds at the positions corresponding to multiple (8 to 42) tuyeres installed horizontally in the circumferential direction of the blast furnace.

The adjustment of the charge position of ore and coke to be charged through the rotating chute is made on at least one of ore or coke. In addition, the method of adjusting the charge position may be made by changing the tilt angle of the rotating chute, changing the rotational speed of the rotating chute, changing the burden feed speed, or any combination thereof. When changing the tilt angle of the rotating chute, it is common to select one of the pre-set tilt angle values. In addition to this, according to the present disclosure, by changing the set tilt angle value to an arbitrary value, it is possible to charge raw materials between charge positions according to the pre-set tilt angle, which was not possible in the conventional techniques, and to make finer adjustment of charge positions.

Changing the rotational speed of the rotating chute or changing the feed speed of the burden means changing the charge speed of the burden being charged at a particular position in a unit time. For example, if the rotational speed of the rotating chute is changed while keeping the feed speed of the burden to the rotating chute constant, the charge amount of the burden per hour, i.e., the charge speed (deposition speed) of the burden to be fed will be smaller at a position where the rotational speed is high. In addition, if the feed speed of the burden to the rotating chute is reduced while keeping the rotational speed of the rotating chute constant, the charge speed (deposition speed) at a certain position is slowed down. Of course, both the rotational speed of the rotating chute and the feed speed of the burden may be changed at the same time.

The feed speed of the burden can be controlled using a burden feed speed controller provided between the hopper provided on the blast furnace top and the rotating chute. For example, a valve whose opening degree can be adjusted can be installed at the bottom of the hopper, and the feed speed of the burden can be controlled by controlling the opening degree.

The position where the burden falls can be estimated more accurately by calculating the drop trajectory using a known method, taking into account the tilt angle and rotational speed of the rotating chute, and the physical properties and drop speed of the burden.

When a circumferential variation in the profiles of the burden or the descent speed of raw materials is observed, the variation is resolved by changing the charge position and/or charge speed of the burden. At this time, it is preferable to make an adjustment using the ore layer thickness ratio (=ore layer thickness/(ore layer thickness+coke layer thickness)) as an index. The descent states of raw materials at certain positions in the circumferential and radial directions of the blast furnace are governed by the coke consumption rate and the melt drop of ores at these positions. When the amount of hot blast blown in from tuyeres or the injection ratio of pulverized coal or the like is constant, the coke consumption rate at that position is constant, and the more coke present at that position, the slower the descent speed. In other words, if the ore layer thickness ratio is high, the descent speed of raw materials will be faster because the amount of coke will be relatively low at that position, and vice versa if the ore layer thickness ratio is low, the descent speed of raw materials will be slower.

Taking advantage of this relationship, at a position where the descent speed of the burden is large, an action is taken to either increase the charge amount of coke or reduce the charge amount of ore (i.e., reduce the ore layer thickness ratio) in order to lower the descent speed. It is also possible to take both actions to increase the charge amount of coke and reduce the charge amount of ore. In order to increase the descent speed, the opposite action is taken. If the position of the burden surface is high in the burden profile distribution, an action is taken to increase the descent speed.

It is also possible to directly adjust the distribution of the ore layer thickness ratio calculated from the profiles. For example, an action can be taken to increase the ore layer thickness ratio by increasing the charge amount of ore or reduce the charge amount of coke with a constant layer thickness at one charge. It is also possible to take both actions to increase the charge amount of ore and reduce the charge amount of coke.

With the conventional methods, when adjusting the ore layer thickness ratio (=ore layer thickness/(ore layer thickness+coke layer thickness)) calculated from the deposition of raw materials at each rotation obtained by the profile measurement device, it was only possible to adjust it within a certain range. In contrast, according to the present disclosure, it is possible to precisely control the ore layer thickness ratio and to adjust it to the conditions of an appropriate ore layer thickness ratio.

As a criterion for taking an action against the variation described above, a certain value may be determined in advance, and an action may be taken when the difference between the measured value or the calculated value and the average value thereof exceeds the predetermined value. This predetermined value may be, for example, the standard deviation in the circumferential direction of the measured or calculated values, or it may be a predetermined value such as two or three times the standard deviation depending on the operational necessity.

The tilt angle of the rotating chute is changed during rotation of the rotating chute. By changing the tilt angle setting of the rotating chute during rotation of the rotating chute, it is possible to adjust the change in the ore layer thickness ratio in the circumferential direction of the blast furnace with a high degree of accuracy, compared to the conventional charging methods in which only uniform settings are available in the circumferential direction of the blast furnace. In particular, by using the profile measurement device disclosed herein, it is possible to obtain information of the burden charge surface in the blast furnace in the circumferential direction of the blast furnace, enabling more precise control in the circumferential direction of the blast furnace and providing an advantageous effect. This method is particularly effective when there is a reverse variation in the outer or inner circumference side of the position at which the variation in profiles or descent speed in the circumferential direction is to be resolved, because the tilt angle of the rotating chute can be changed to allow the burden to be charged on the outer or inner circumference side of the blast furnace.

If it is desirable to resolve circumferential variation at a specific radial position, it is effective to change the rotational speed of the rotating chute or to change the feed speed of the burden. For example, if it is desirable to increase the amount of coke to be charged at a particular position, the amount of coke fed to the rotating chute is kept constant and the rotational speed in the region where coke is fed at that position is slowed down. Alternatively, while the rotational speed is kept constant, the feed speed at which coke is fed to the rotating chute is increased at a time when the coke reaches the position where the amount of coke is to be increased. In this case, for example, the motion of the burden can be analyzed and the rotational speed and the feed speed can be controlled at an appropriate time such that raw materials reach the position to be adjusted.

Although the ore layer thickness ratio varies irregularly, it is believed that this is due to variations in the ore layer thickness ratio caused by changes in the particle size of ore, coke, and other charged raw materials. In other words, if the particle size of the charged raw materials can be detected in advance, it is possible to take an action more promptly to suppress the fluctuation of the ore layer thickness ratio. For this purpose, it is preferable to further include a device that can continuously and automatically obtain, for example, the particle sizes of coke and ore.

EXAMPLES

Example 1

The following describes operational examples in which the distribution of the ore layer thickness ratio in the circumferential direction of the blast furnace was controlled according to the present disclosure. Specifically, operational tests were carried out in a large blast furnace with the structure illustrated in FIG. 1. The transition of various operating conditions in this operation is presented in Table 1.

Figure 4:
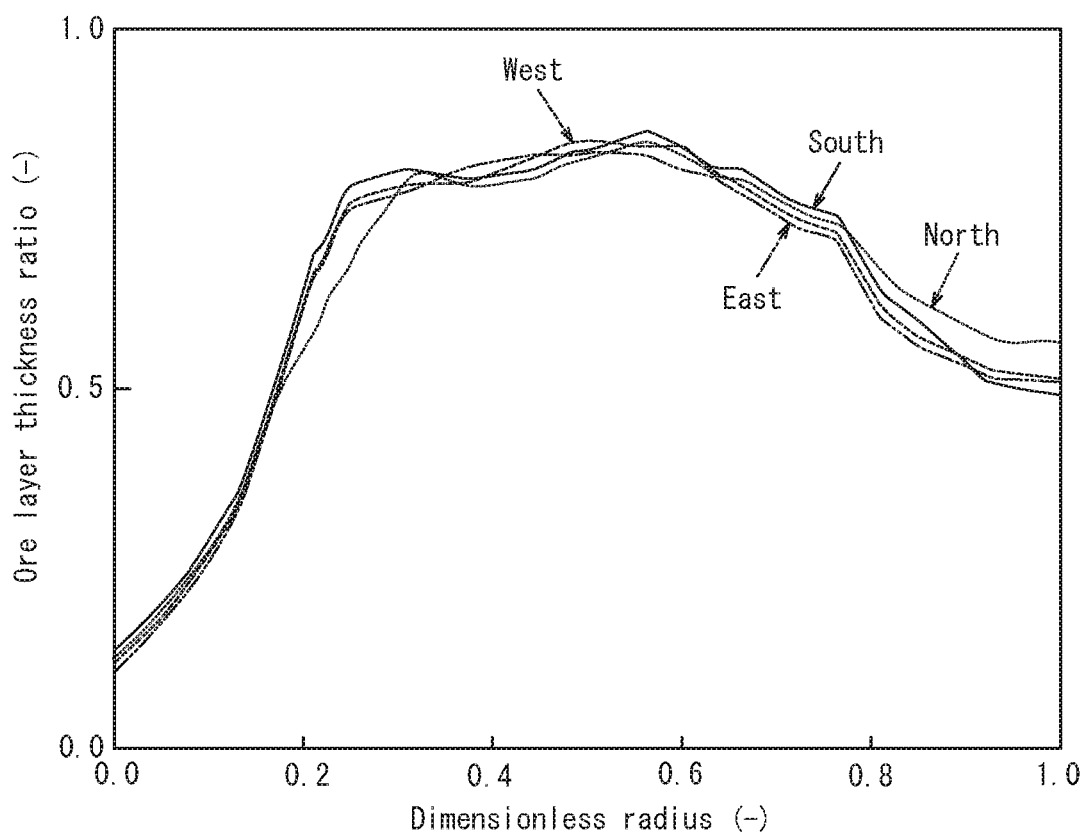
FIG. 4 illustrates the ore layer thickness ratio in the circumferential direction of the blast furnace.
Figure 6:
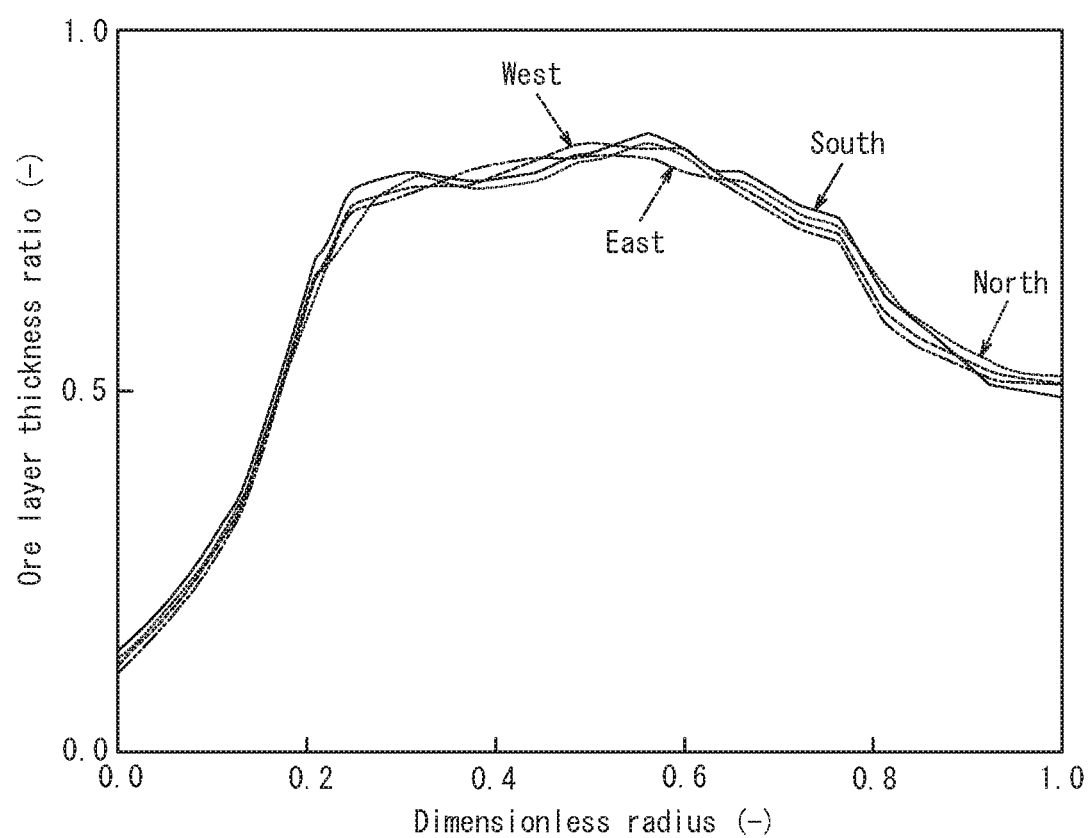
FIG. 6 illustrates the ore layer thickness ratio in the circumferential direction of the blast furnace.

In this operation, surface profiles of the burden are derived in the circumferential direction of the blast furnace at each rotation of the rotating chute or during charging interruptions. In this embodiment, circumferential measurements were made at a dimensionless radius of 0 to 1.0 to obtain the surface profiles of the burden throughout the blast furnace. The descent speed was determined from the obtained surface profiles in the circumferential direction of the blast furnace as described above, and the ore layer thickness ratio was also obtained. Table 1 lists the ore layer thickness ratios measured at four locations with a dimensionless radius of 0.95, east, west, north, and south, as representative data from the data obtained in the circumferential direction. FIG. 4 illustrates a case where variation in the ore layer thickness ratio thus obtained occurred. The measurement results in FIG. 4 were obtained in the dimensionless radii of 0 to 1 in the east, west, north, and south directions.

angle of the rotating chute was adjusted toward the wall side (specifically, the tilt angle relative to the central axis of the blast furnace was changed from 25° to 50°) only when coke was charged on the north side during the rotation of the rotating chute, only the ore layer thickness ratio on the blast furnace wall on the north side could be reduced (Example 1). That is, as illustrated in FIG. 6, the deviation of the ore layer thickness ratio in the circumferential direction of the blast furnace was reduced, and as can be seen from Table 1, the permeability resistance index was reduced more than in Comparative Example 1, and the hot metal temperature was also increased. Consequently, the coke ratio could be reduced. Although the permeability resistance index was higher than in Comparative Example 2, the overall operation was preferable. This is considered to be due to poor overall operational performance in Comparative Example 2, although the permeability resistance index was low, because the ore layer thickness ratio decreased near the blast furnace wall throughout the blast furnace, causing the amount of coke to increase near the blast furnace wall, the gas to flow near the blast furnace wall, and the gas to be no longer used effectively.

TABLE 1

| Item | Unit | Comparative Example 1 | Comparative Example 2 | Example 1 |
|---|---|---|---|---|
| Production | t/d | 10056 | 10033 | 10068 |
| Coke ratio | kg/t | 333 | 333 | 328 |
| Pulverized coal ratio | kg/t | 177 | 179 | 177 |
| Blast volume | Nm$^3$/min | 6898 | 6898 | 6898 |
| Oxygen enrichment rate | % | 4.2 | 4.2 | 4.2 |
| Blast temp. | ° C. | 1191 | 1191 | 1191 |
| Blast moisture | g/Nm$^3$ | 21 | 21 | 21 |
| Permeability resistance index | — | 2.95 | 2.85 | 2.89 |
| Gas utilization rate | % | 48.7 | 48.6 | 49.2 |
| Hot metal Temp. | ° C. | 1494 | 1492 | 1501 |
| Ore layer thickness ratio (north) | — | 0.56 | 0.55 | 0.53 |
| Ore layer thickness ratio (east) | — | 0.52 | 0.5 | 0.52 |
| Ore layer thickness ratio (south) | — | 0.51 | 0.49 | 0.51 |
| Ore layer thickness ratio (west) | — | 0.52 | 0.5 | 0.52 |

In other words, the case listed in Table 1 as Comparative Example 1 represents a case where when surface profiles of the blast furnace burden were measured and the ore layer thickness ratio was calculated, it was observed that only the ore layer thickness ratio on the north wall side on the circumference of the blast furnace was high and the operation was continued as it was. In this operation, as listed in Table 1, the permeability resistance index was high and the gas permeability in the blast furnace was poor.

Figure 5:
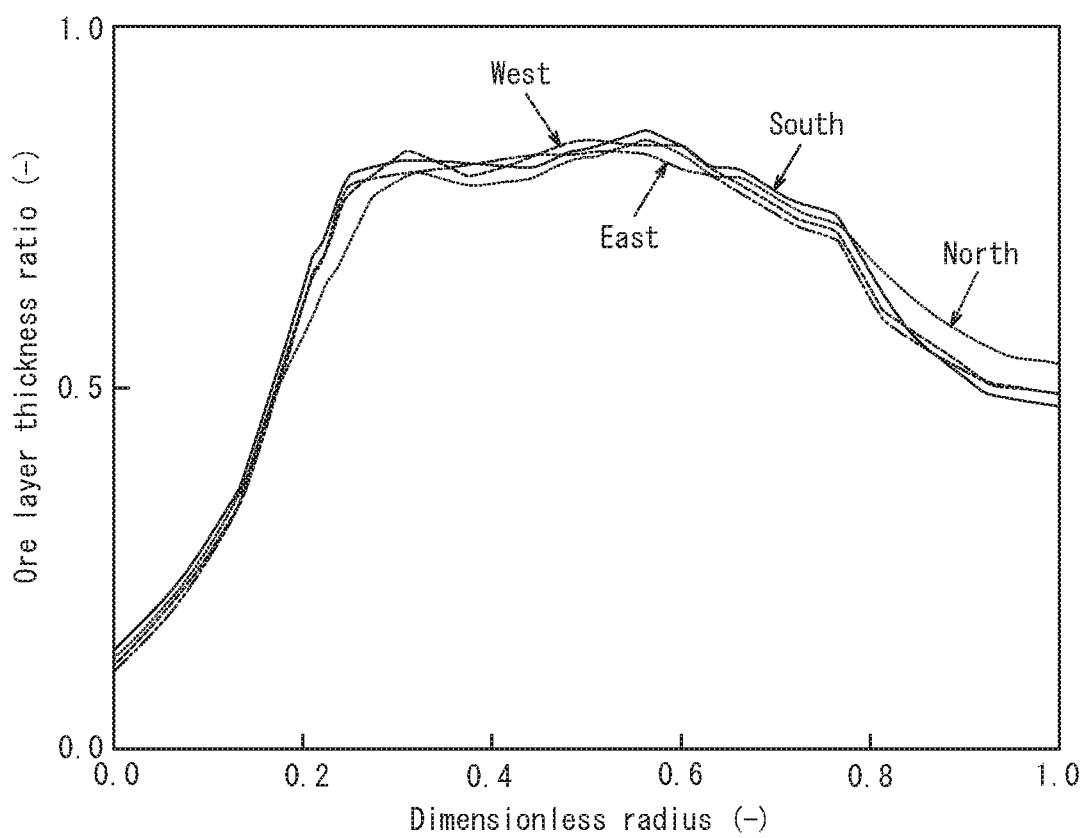
FIG. 5 illustrates the ore layer thickness ratio in the circumferential direction of the blast furnace.

Next, to reduce the ore layer thickness ratio on the blast furnace wall side, the tilt angle of the rotating chute when charging coke was adjusted toward the blast furnace wall side (specifically, the tilt angle relative to the central axis of the blast furnace was changed from 25° to 50°) and then the rotating chute was rotated. As a result, as illustrated in FIG. 5, the overall ore layer thickness ratio on the blast furnace wall side was reduced (Comparative Example 2). However, as can be seen from Table 1, although the permeability resistance index decreased, the hot metal temperature decreased, resulting in an increase in the reducing agent rate, which is the sum of a coke ratio and a pulverized coal ratio. During this operation, the rotational speed of the rotating chute and the feed speed of raw materials were kept constant.

In order to reduce only the ore layer thickness ratio on the north side following the operation in Example 2, the tilt Example 2

The following describes an example of adjusting the descent speed of raw materials. The surface profiles of the burden in the circumferential direction were measured at a dimensionless radius of 0.8 and the descent speed of raw materials at each position was calculated. Among the results, the measured values in the four directions of east, west, north, and south and the operational results are listed in Table 2. In Table 2, Comparative Example 3 has a high descent speed in the eastern position compared with the other positions. Under this condition, the feed speed of coke to the rotating chute was kept constant and the rotational speed of the rotating chute was reduced by 20% in the range of coke falling on the east side while the rotating chute is rotating at a tilt angle at which coke was charged at a dimensionless radius of 0.8, such that more coke was charged on the east side and the ore layer thickness ratio was reduced on the east side. At the time of charging ore, the feed speed of ore and the rotational speed of the rotating chute were kept constant. This adjustment was carried out in five successive charges. As a result, the descent speed at the eastern position was slowed down, and the variation in descent speed in the inner circumferential direction of the blast furnace decreased. As a result, the permeability resistance index was reduced and the hot metal temperature was improved.

In Example 2, when charging coke, the amount of coke deposited in a particular direction could be increased by reducing the rotational speed of the rotating chute in the particular direction in the blast furnace while keeping the feed speed of coke to the rotating chute constant. On the other hand, the feed speed of coke may be increased such that the amount of coke falling in the particular direction is increased while keeping the rotational speed of the rotating chute constant. The same effect as in this embodiment was also obtained when the feed speed of coke in a particular direction was increased while keeping the rotational speed of the rotating chute constant.

TABLE 2

| Item | Unit | Comparative Example 3 | Example 2 |
|---|---|---|---|
| Production | t/d | 10060 | 10068 |
| Coke ratio | kg/t | 333 | 328 |
| Pulverized coal ratio | kg/t | 177 | 177 |
| Blast volume | Nm$^3$/min | 6898 | 6898 |
| Oxygen enrichment rate | % | 4.2 | 4.2 |
| Blast temp. | ° C. | 1191 | 1191 |
| Blast moisture | g/Nm$^3$ | 21 | 21 |
| Permeability resistance index | — | 2.93 | 2.88 |
| Gas utilization rate | % | 48.5 | 49.1 |
| Hot metal Temp. | ° C. | 1493 | 1500 |
| Descent speed (north) | mm/s | 0.82 | 0.84 |
| Descent speed (east) | mm/s | 0.88 | 0.83 |
| Descent speed (south) | mm/s | 0.85 | 0.84 |
| Descent speed (west) | mm/s | 0.83 | 0.83 |
| Ore layer thickness ratio (north) | — | 0.53 | 0.52 |
| Ore layer thickness ratio (east) | — | 0.54 | 0.52 |
| Ore layer thickness ratio (south) | — | 0.51 | 0.51 |
| Ore layer thickness ratio (west) | — | 0.52 | 0.53 |

REFERENCE SIGNS LIST 1 blast furnace body
2 rotating chute
3 tuyere
4 burden
5 profile measurement device
5a distance meter
5b arithmetic unit
6 tilt angle controller
7 rotational speed controller
8 burden feed speed controller

The invention claimed is:

1. A blast furnace apparatus comprising:
a rotating chute configured to charge a raw material into a blast furnace from a blast furnace top;
a profile measurement device configured to measure surface profiles of a burden charged into the blast furnace through the rotating chute; and
a tilt angle controller configured to control a tilt angle of the rotating chute, wherein
the profile measurement device comprises a radio wave distance meter, which is installed on the blast furnace top and configured to measure a distance to the surface of the burden in the blast furnace, and derives the surface profiles of the burden on a basis of distance data for the entire blast furnace related to distances to the surface of the burden obtained by scanning a detection wave of the radio wave distance meter in the blast furnace in a circumferential direction;
the profile measurement device comprises at least one of
an arithmetic unit configured to command, on a basis of the surface profiles obtained, the tilt angle controller to change the tilt angle of the rotating chute during rotation,
an arithmetic unit configured to command, on a basis of the surface profiles obtained, a speed controller to change a rotational speed of the rotating chute during rotation, or
an arithmetic unit configured to command, on a basis of the surface profiles obtained, a speed controller to change a feed speed of the burden fed to the rotating chute during rotation; and
the profile measurement device further comprises an arithmetic unit configured to calculate a descent speed of the burden over an entire circumference of the blast furnace on a basis of the surface profiles of the burden.

2. An operation method for a blast furnace using the blast furnace apparatus as recited in claim 1 in which ore and coke are charged from the rotating chute into the blast furnace, the operation method comprising:
deriving, by the profile measurement device, surface profiles of the burden; and
in a case where variation in the surface profiles derived, or variation in descent speeds of the burden derived from the surface profiles derived or variation in ore layer thickness ratios, is greater than a predetermined value, adjusting either or both of a charge position of at least one of ore or coke charged through the rotating chute and a charge speed of at least one of ore or coke charged through the rotating chute.

3. The operation method for a blast furnace according to claim 2, wherein the adjusting of the charge position includes changing the tilt angle of the rotating chute during rotation and adjusting the surface profiles at each rotation of the rotating chute.

4. The operating method for a blast furnace according to claim 2, wherein the adjusting of the charge speed is performed during rotation of the rotating chute.

5. The operating method for a blast furnace according to claim 3, wherein the adjusting of the charge speed is performed during rotation of the rotating chute.

6. An operation method for a blast furnace using a blast furnace apparatus comprising:
a rotating chute configured to charge a raw material into a blast furnace from a blast furnace top;
a profile measurement device configured to measure surface profiles of a burden charged into the blast furnace through the rotating chute; and
a tilt angle controller configured to control a tilt angle of the rotating chute,
wherein
the profile measurement device comprises a radio wave distance meter, which is installed on the blast furnace top and configured to measure a distance to the surface of the burden in the blast furnace, and derives the surface profiles of the burden on a basis of distance data for the entire blast furnace related to distances to the surface of the burden obtained by scanning a detection wave of the radio wave distance meter in the blast furnace in a circumferential direction; and
the profile measurement device comprises at least one of
an arithmetic unit configured to command, on a basis of the surface profiles obtained, the tilt angle controller to change the tilt angle of the rotating chute during rotation, an arithmetic unit configured to command, on a basis of the surface profiles obtained, a speed controller to change a rotational speed of the rotating chute during rotation, or an arithmetic unit configured to command, on a basis of the surface profiles obtained, a speed controller to change a feed speed of the burden fed to the rotating chute during rotation, the operation method comprising:

charging ore and coke from the rotating chute into the blast furnace;

deriving, by the profile measurement device, surface profiles of the burden; and in a case where variation in the surface profiles derived, or variation in descent speeds of the burden derived from the surface profiles derived or variation in ore layer thickness ratios, is greater than a predetermined value, adjusting either or both of a charge position of at least one of ore or coke charged through the rotating chute and a charge speed of at least one of ore or coke charged through the rotating chute.

7. The operation method for a blast furnace according to claim 6, wherein the adjusting of the charge position includes changing the tilt angle of the rotating chute during rotation and adjusting the surface profiles at each rotation of the rotating chute.

8. The operating method for a blast furnace according to claim 6, wherein the adjusting of the charge speed is performed during rotation of the rotating chute.

9. The operating method for a blast furnace according to claim 7, wherein the adjusting of the charge speed is performed during rotation of the rotating chute.

* * * * *